US012725472B2

(12) United States Patent
Woischwill et al.

(10) Patent No.: US 12,725,472 B2
(45) Date of Patent: Sep. 1, 2026

(54) TRAJECTORY CONTROL SYSTEM FOR A VEHICLE

(71) Applicant: GM Global Technology Operations LLC, Detroit, MI (US)

(72) Inventors: Christopher George Woischwill, Bowmanville (CA); Shiva Ghasemi Dehkordi, Toronto (CA); Ami Woo, Calgary (CA); Amirreza Mirbeygi Moghaddam, Toronto (CA); Reza Zarringhalam, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 99 days.

(21) Appl. No.: 18/657,455

(22) Filed: May 7, 2024

(65) Prior Publication Data

US 2025/0349162 A1 Nov. 13, 2025

(51) Int. Cl.
*G07C 5/08* (2006.01)

(52) U.S. Cl.
CPC .................................. *G07C 5/0841* (2013.01)

(58) Field of Classification Search
CPC .................................................... G07C 5/0841
See application file for complete search history.

(56) References Cited

U.S. PATENT DOCUMENTS

| | | | | |
|---|---|---|---|---|
| 2021/0046923 | A1* | 2/2021 | Olson | B60W 30/095 |
| 2021/0183171 | A1* | 6/2021 | Shiue | H04L 67/12 |
| 2021/0394794 | A1* | 12/2021 | Gyllenhammar | B60W 40/10 |

FOREIGN PATENT DOCUMENTS

| | | | |
|---|---|---|---|
| DE | 112007002946 | T5 | 7/2014 |
| DE | 102017010180 | B3 | 4/2019 |
| DE | 102023114041 | A1 | 12/2023 |

OTHER PUBLICATIONS

English Translation of DE102019212666A1 Author: Hruschka et al. Title: Control of an Autonomous or Semi-autonomous Vehicle Date: Sep. 17, 2020 (Year: 2020).*

* cited by examiner

*Primary Examiner* — Steven Vu Nguyen
(74) *Attorney, Agent, or Firm* — Honigman LLP; Matthew H. Szalach

(57) ABSTRACT

A system includes data processing hardware and memory hardware in communication with the data processing hardware. The memory hardware stores instructions that, when executed on the data processing hardware cause the data processing hardware to perform operations. The operations include monitoring, via a trajectory control architecture of a controller, at least one active safety feature and a trajectory of a vehicle, tracking, via the trajectory control architecture, an error of the trajectory, and comparing the tracked error with a trajectory history stored on the controller. The operations also include adapting, based on the comparison of the tracked error and the trajectory history, performance elements of the vehicle via the trajectory control architecture and monitoring, based on the adapted performance elements, the trajectory of the vehicle.

20 Claims, 8 Drawing Sheets

TRAJECTORY CONTROL SYSTEM FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a trajectory control system for a vehicle.

Vehicles typically include a control system that monitors various executions of the vehicle. However, such control systems may have difficultly tracking a path of the vehicle because the paths are typically not fixed in time or space. Many control systems rely on camera or radar systems to update the path, which may be difficult to identify an error between the vehicle and the path. Thus, there is a need to improve the control system to improve error tracking of the vehicle relative to the path.

SUMMARY

In some aspects, a computer-implemented method when executed by data processing hardware causes the data processing hardware to perform operations. The operations include monitoring, via a trajectory control architecture of a controller, at least one active safety feature and a trajectory of a vehicle, tracking, via the trajectory control architecture, an error of the trajectory, and comparing the tracked error with a trajectory history stored on the controller. The operations also include adapting, based on the comparison of the tracked error and the trajectory history, performance elements of the vehicle via the trajectory control architecture and monitoring, based on the adapted performance elements, the trajectory of the vehicle.

In some examples, the error may include at least one of a tracking error and a trajectory error. The operations may include determining, via the trajectory control architecture, at least one of a large tracking error and a large trajectory error based on a maneuver phase. In some instances, determining the large tracking error and large trajectory error may include comparing the maneuver phase with an error threshold of the trajectory control architecture. Optionally, the maneuver phase may include one or more of an initiation phase, a countersteer phase, and a stability phase. The operations may also include projecting, based on a time step and the trajectory history, a new trajectory at future time steps. In some configurations, tracking the error may include identifying a tracking error based on the trajectory history and a current position. Optionally, projecting the new trajectory may include comparing a historical trajectory window with a future trajectory point. The operations may include determining, based on the comparison between the historical trajectory window and the future trajectory point, a trajectory error.

In other aspects, a system includes data processing hardware and memory hardware in communication with the data processing hardware. The memory hardware stores instructions that, when executed on the data processing hardware cause the data processing hardware to perform operations. The operations include monitoring, via a trajectory control architecture of a controller, at least one active safety feature and a trajectory of a vehicle, tracking, via the trajectory control architecture, an error of the trajectory, and comparing the tracked error with a trajectory history stored on the controller. The operations also include adapting, based on the comparison of the tracked error and the trajectory history, performance elements of the vehicle via the trajectory control architecture and monitoring, based on the adapted performance elements, the trajectory of the vehicle.

In some examples, the error may include at least one of a tracking error and a trajectory error. The operations may also include determining, via the trajectory control architecture, at least one of a large tracking error and a large trajectory error based on a maneuver phase. In some instances, determining the large tracking error and large trajectory error may include comparing the maneuver phase with an error threshold of the trajectory control architecture. Optionally, the maneuver phase may include one or more of an initiation phase, a countersteer phase, and a stability phase. The operations may include projecting, based on a time step and the trajectory history, a new trajectory at future time steps. In some configurations, tracking the error may include identifying a tracking error based on the projected new trajectory and the trajectory history. In other examples, projecting the new trajectory may include comparing a historical trajectory window with a future trajectory point. The operations may also include determining, based on the comparison between the historical trajectory window and the future trajectory point, a trajectory error.

In additional aspects, a computer-implemented method, when executed by data processing hardware, causes the data processing hardware to perform operations. The operations include monitoring, via a trajectory control architecture of a controller, at least one active safety feature and a trajectory of a vehicle, tracking, via the trajectory control architecture, one of a trajectory error and a tracking error of the trajectory, and projecting, based on a time step and a trajectory history, a new trajectory at future time steps. The operations also include comparing the tracked error and a historical trajectory window with a future trajectory point, adapting, via the trajectory control architecture, performance elements of the vehicle based on the projected new trajectory and the comparison of the tracked error and the trajectory history with the future trajectory point, and monitoring, based on the adapted performance elements, the trajectory of the vehicle.

In some examples, the operations may include determining, via the trajectory control architecture, at least one of a large tracking error and a large trajectory error based on a maneuver phase.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
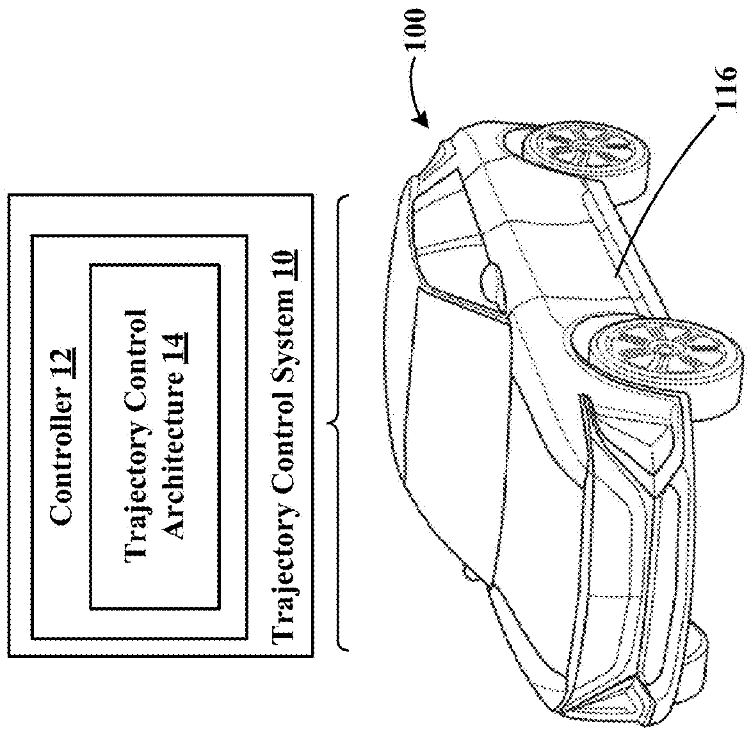
FIG. 1 is a schematic view of a vehicle equipped with a trajectory control system according to the present disclosure.
Figure 2:
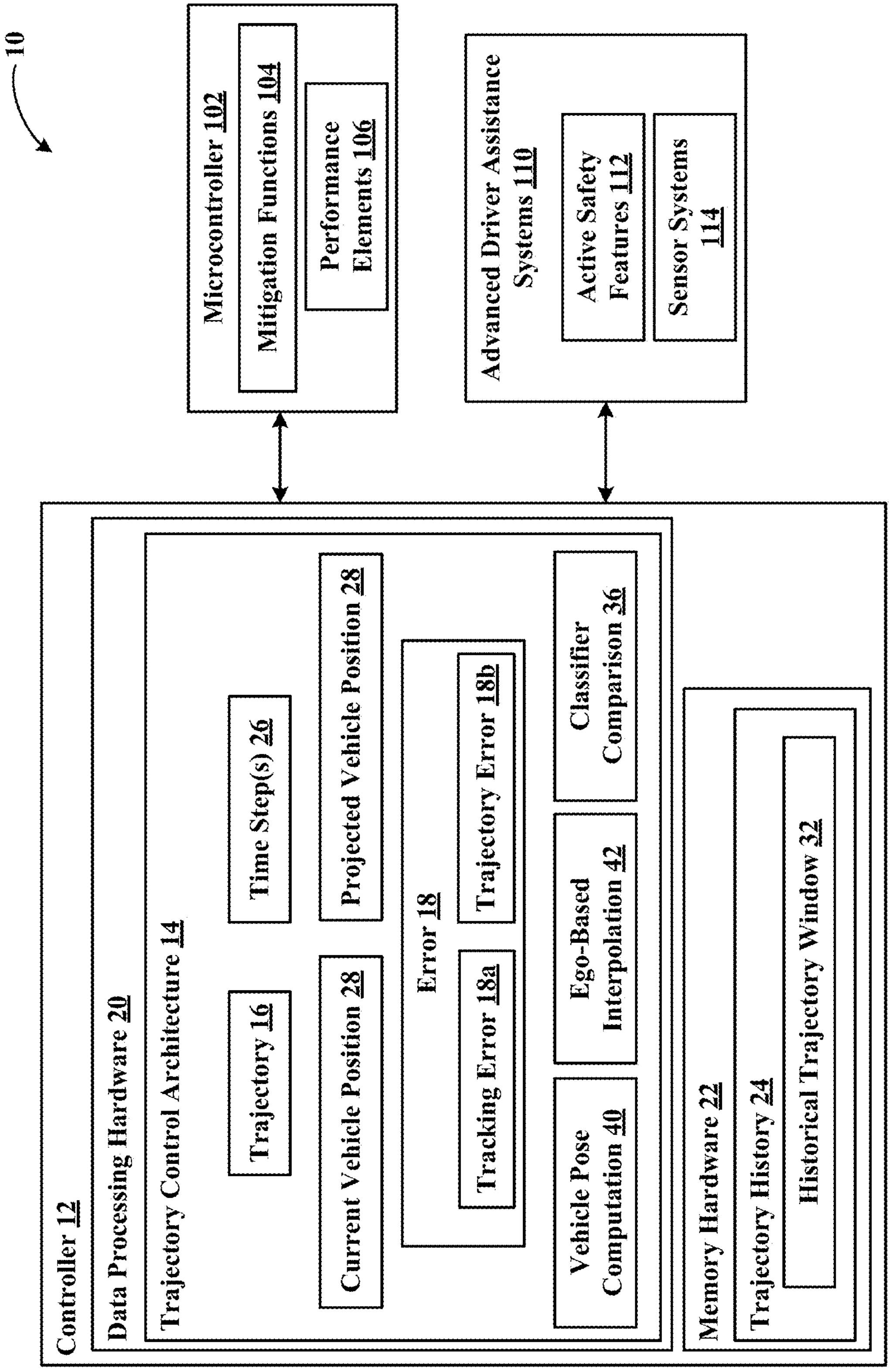
FIG. 2 is an exemplary block diagram of a trajectory control system according to the present disclosure.
Figure 3:
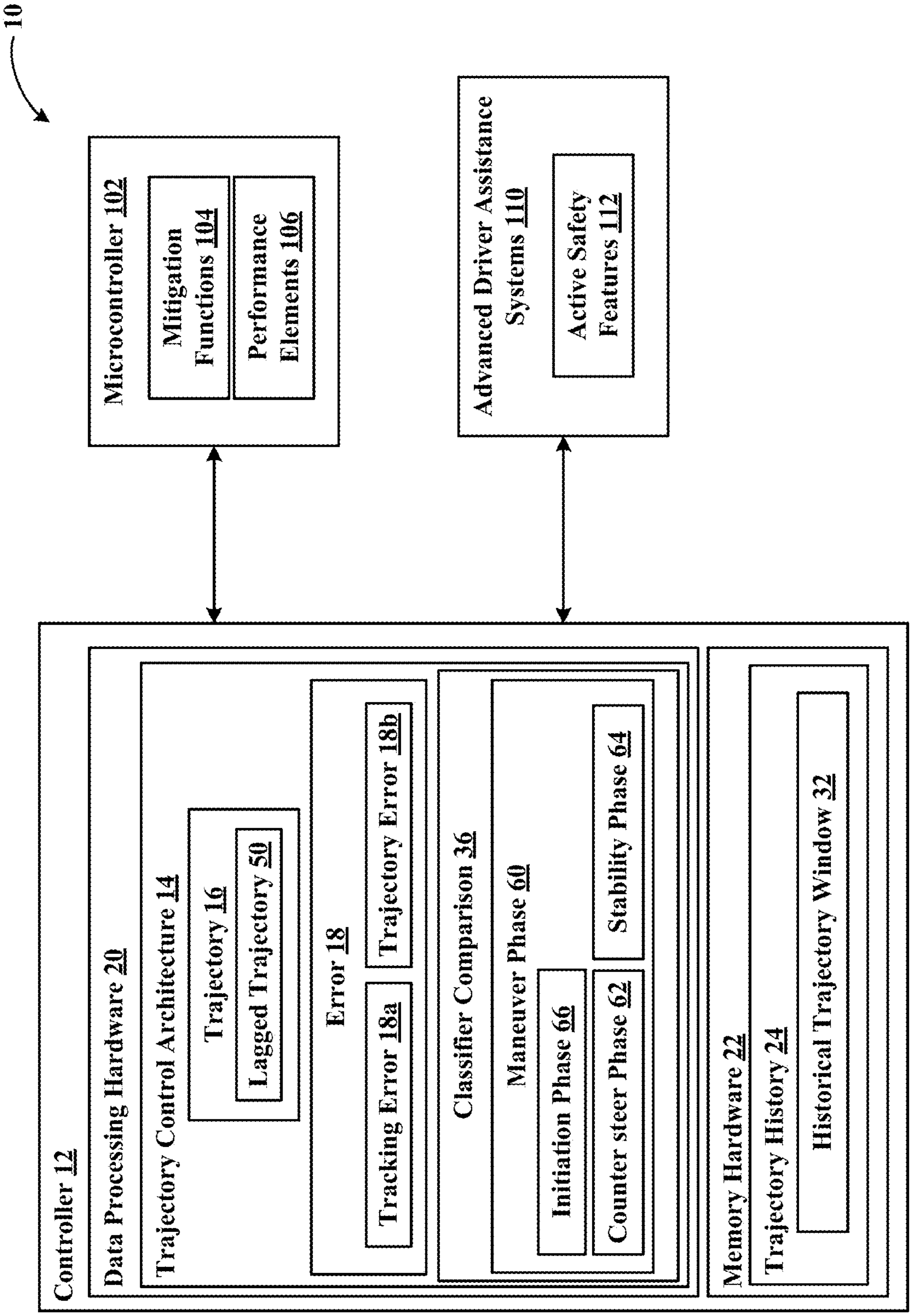
FIG. 3 is another exemplary block diagram of a trajectory control system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-5, a trajectory control system 10 includes a controller 12 configured with a trajectory control architecture 14. The trajectory control system 10 is integrated as part of a vehicle 100 and communicatively couples the controller 12 with a microcontroller 102 and advanced driver assistance systems 110 of the vehicle 100. The trajectory control system 10 is configured to provide real-time tracking of a trajectory 16 of the vehicle 100 and real-time adaptation of the advanced driver assistance systems 110 in response to executions performed by the trajectory control architecture 14. For example, the trajectory control architecture 14 may detect an error 18 and communicate with the microcontroller 102 to execute mitigation functions 104 in response to the error 18, described in more detail below.

The advanced driver assistance systems 110 of the vehicle 100 include active safety features 112 and sensor system 114 that cooperate with the active safety features 112. The active safety features 112 may include, but are not limited to, assisted evasive steering, lane keep assist, and lane centering. While some of the advanced driver assistance systems 110 may provide the driver with a hands-free experience, the active safety features 112 function to supplement the active driver control of the vehicle 100. The trajectory control architecture 14 advantageously assists in supervising and executing real-time corrective actions for the active safety feature 112 of the advanced driver assistance systems 110. For example, the trajectory control architecture 14 is configured to adapt performance elements 106 executed by a microcontroller 102 of the vehicle 100 based on a comparison of the tracked error 18 and the trajectory history, described in more detail herein. In some examples, the adaptations may be tightening or dampening steering controls of the performance elements 106 in response to the detected errors 18 relative to the trajectory 16, as described in more detail below. In response, the trajectory control architecture 14 monitors the trajectory 16 of the vehicle 100 based on the adapted performance elements 106.

The vehicle 100 utilizes the advanced driver assistance systems 110 to execute the active safety features 112. For example, the vehicle 100 may be operated at least in part by the advanced driver assistance systems 110, such that the active safety features 112 may assist the driver in operating the vehicle 100. The trajectory control architecture 14 is configured for the controller 12 to have a supervisory mode that is active when the active safety features 112 are active. Thus, the trajectory control architecture 14 may be operable when one or more active safety features 112 are operable, such that the active safety feature 112 may be assisting the driver in operating the vehicle 100. For example, the trajectory control architecture 14 automatically is operable and applies as long as any level of the active safety features 112 are active.

In some examples, a driver of the vehicle 100 may be operating the vehicle 100 by applying a level of torque, and the active safety feature(s) 112 assist the driver. In other examples, the driver does not apply torque and the active safety feature(s) 112 are activated and performing operative function of the vehicle 100. For example, the active safety feature 112 may include lane centering in which the vehicle 100 is controlled by the advanced driver assistance systems 110 with the driver present and alert. In either example, the controller 12 executes the trajectory control architecture 14 to supervise and further assist the active safety feature(s) 112 when the active safety features 112 are active.

Referring to FIGS. 2-6, the trajectory control architecture 14 is executed by data processing hardware 20 of the controller 12. The controller 12 also includes memory hardware 22 that is in communication with the data processing hardware 20. The memory hardware 22 stores instructions that, when executed on the data processing hardware 20, cause the data processing hardware 20 to perform operations, set forth herein. The trajectory control architecture 14 utilizes a trajectory history 24 stored on the memory hardware 22 at least in part to identify the error 18. The trajectory history 24 receives the trajectory 16 over various time steps 26 and stores the historical trajectories 16 for reference by the trajectory control architecture 14, as described herein. For example, the trajectory control architecture 14 is configured to identify the error 18 based, at least in part, on a comparison of the trajectory history 24, the time steps 26, and the trajectory 16.

The error 18 may include at least one of a tracking error 18*a* and a trajectory error 18*b*. The tracking error 18*a* may be defined as a difference in a lateral position between a current position 28 of the vehicle 100 and a projected position 30 based on the trajectory 16 from a previous time step 26 at the current time step 26. The trajectory error 18*b* is similar to the tracking error 18*a* in that the trajectory error 18*b* is also a function of the trajectory 16. The trajectory error 18*b*, however, looks at a shorter history window of the time steps 26 and trajectory 16. For example, the trajectory error 18*b* utilizes a historical trajectory window 32 stored as part of the trajectory history 24, whereas the tracking error 18*a* utilizes the trajectory history 24, comprehensively.

The trajectory control architecture 14, in identifying the error 18, may execute at least one of a relative vehicle pose computation 40 and an ego-based trajectory interpolation 42. The relative vehicle pose computation 40 is executed by the trajectory control architecture 14 evaluating the trajectory history 24 in comparison with the current vehicle position 28. For example, the relative vehicle pose computation 40 may be used to identify the tracking error 18*a* by evaluating performance metrics 44 of the vehicle 100 relative to the trajectory 16. The performance metrics 44 may be a function of the trajectory history 24, an integral of path deviation (i.e., trajectory error 18*b*), a trajectory error variance, an integral of heading deviation (i.e., tracking error 18*a*), and a tracking error variance. The trajectory control architecture 14 may also execute the ego-based trajectory interpolation 42, which may be a function of the performance metrics 44 and the historical trajectory window 32. Each of the relative vehicle pose computation 40, the ego-based trajectory interpolation 42, and the performance metrics 44 assist the trajectory control architecture 14 identifying the error 18 and determining whether the trajectory control system 10 should adapt the advanced driver assistance systems 110.

Figure 4:
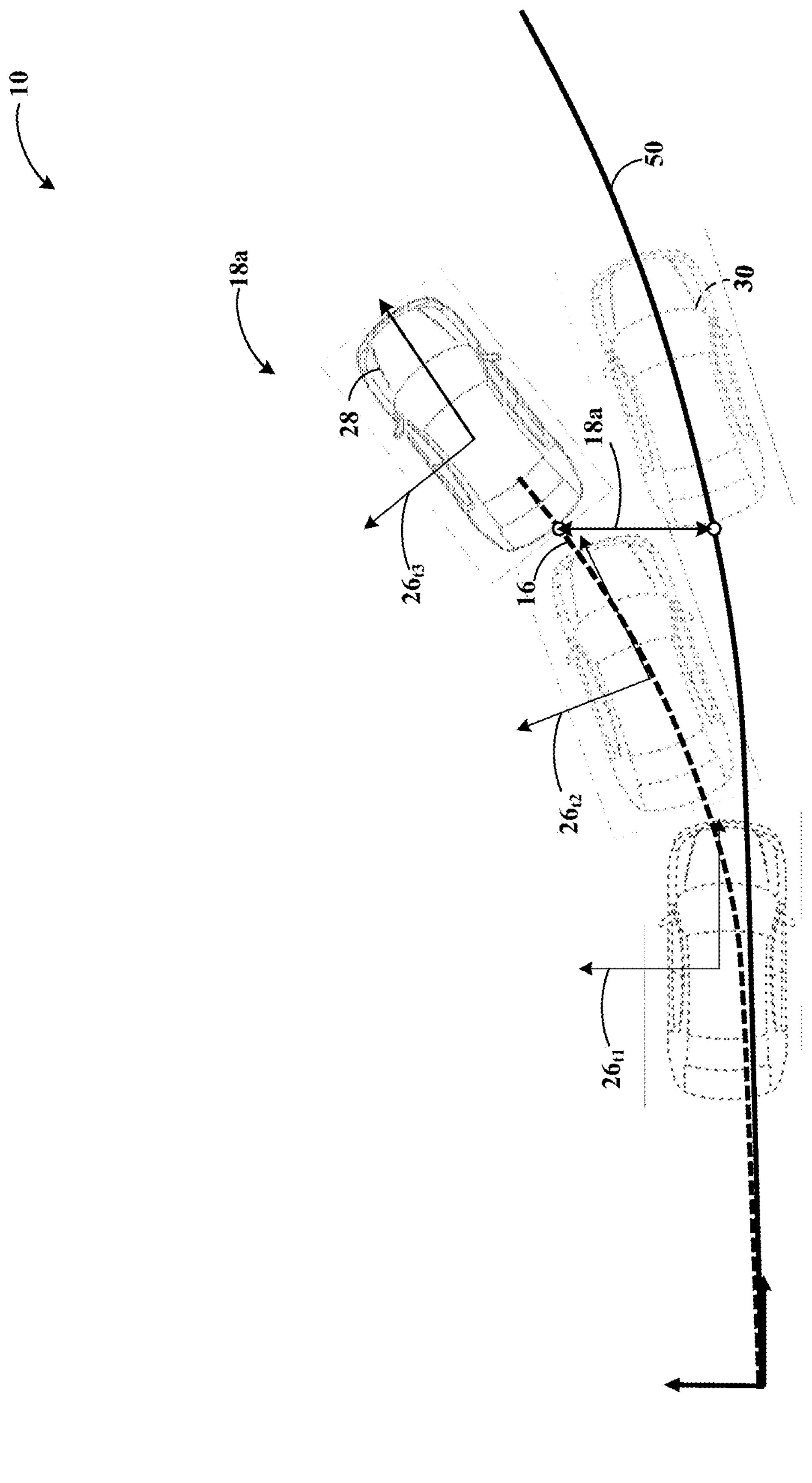
FIG. 4 is a schematic diagram of a trajectory of a vehicle and identifying a tracking error by a trajectory control system according to the present disclosure.
Figure 5:
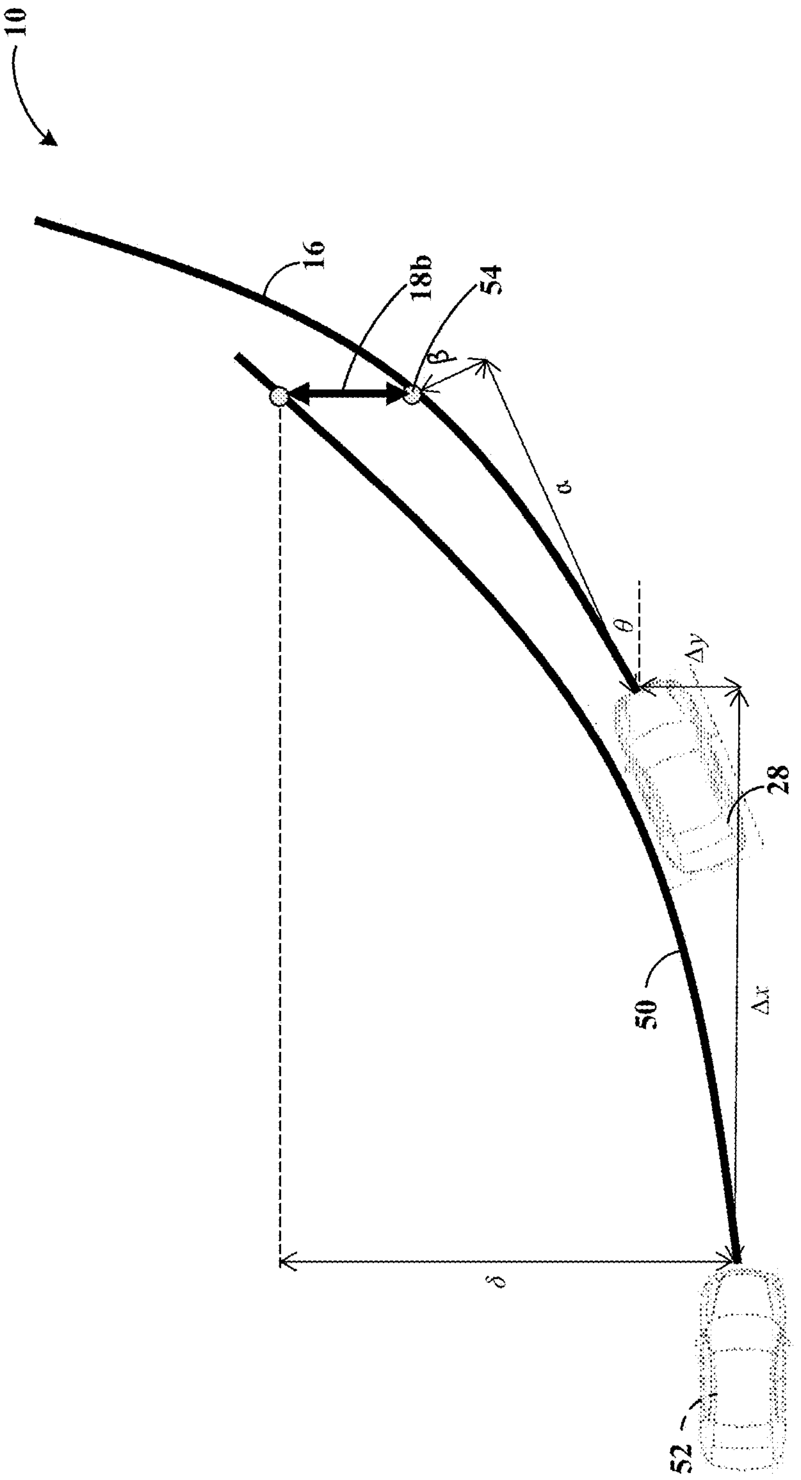
FIG. 5 is another schematic diagram of a trajectory of a vehicle and identifying a trajectory error by a trajectory control system according to the present disclosure.
Figure 6:
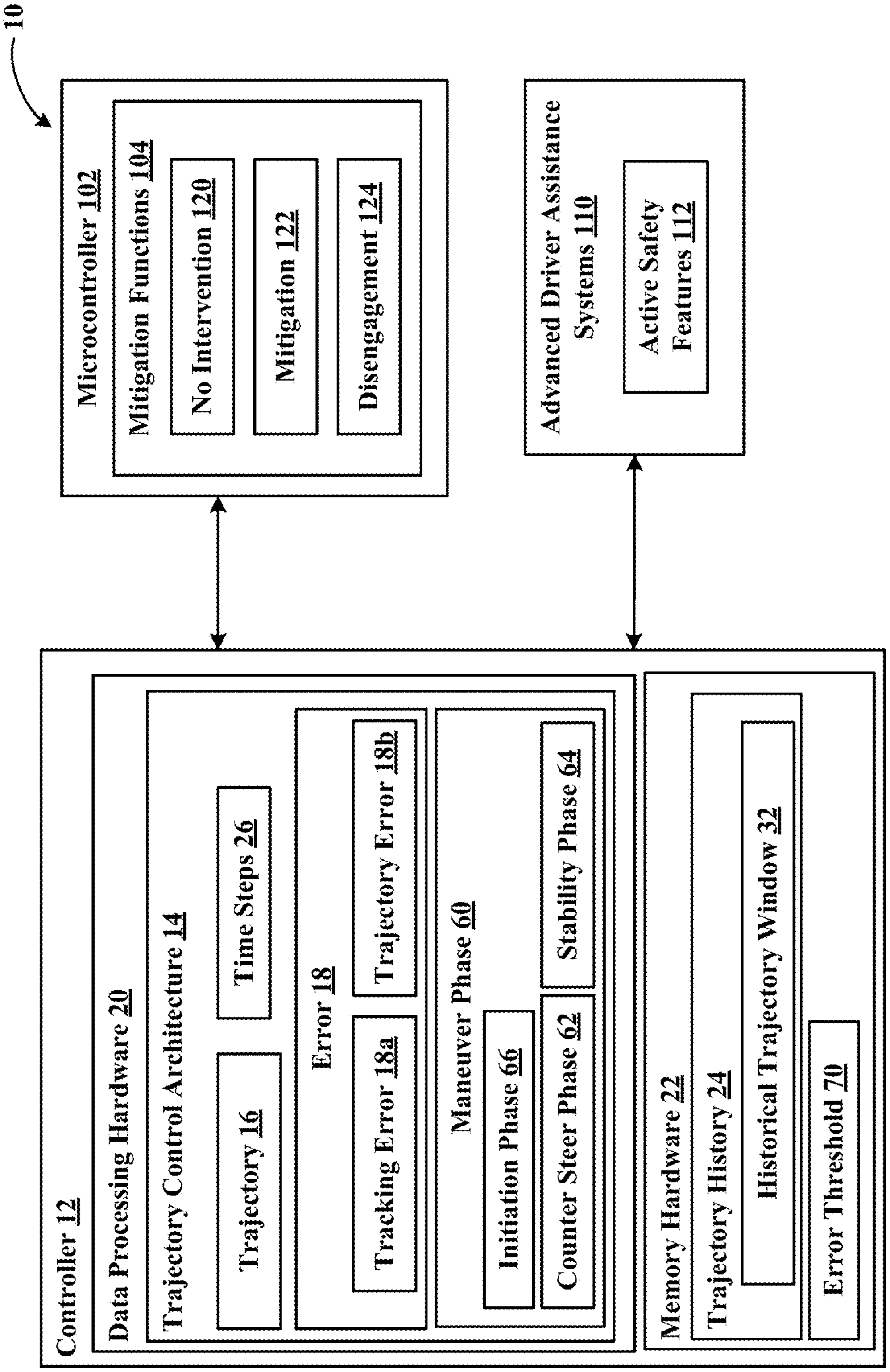
FIG. 6 is an exemplary block diagram of a trajectory control system according to the present disclosure.
Figure 7:
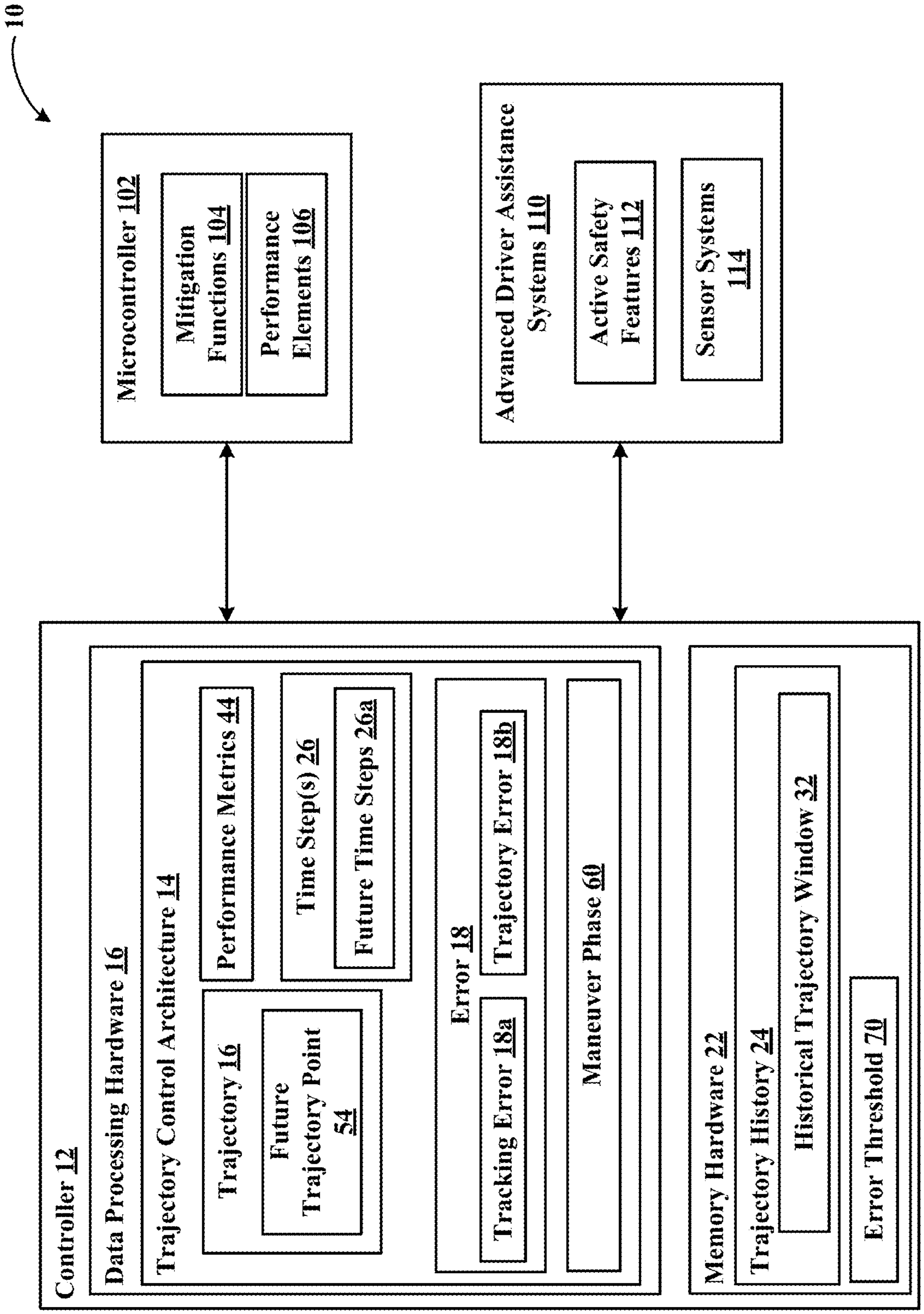
FIG. 7 is another exemplary block diagram of a trajectory control system according to the present disclosure.

FIGS. 4 and 5 illustrate exemplary trajectories 16 in comparison with a lagged trajectory 50 and the associated error 18. For example, FIG. 4 illustrates an example determination of a tracking error 18*a* by the trajectory control system 10. The trajectory control system 10 identifies a desired longitudinal position (x), desired lateral position (y), and a desired heading (ψ) of the vehicle 100 at various time steps $\mathbf{26}_{t1}$-$\mathbf{26}_{t3}$ to identify the current vehicle position 28 in comparison with the projected vehicle position 30 relative to each of the lagged trajectory 50 and the trajectory 16. For example, the longitudinal position (x) may be calculated using the following exemplary equation:

$$x_{CG}(\Delta t)=\sum_{t=0}^{t=\Delta t-\delta t}\left(V_{x,t}\cos\left(\sum_{i=0}^{i=t}\omega_{z,i}\delta t\right)-V_{y,t}\sin\left(\sum_{i=0}^{i=t}\omega_{z,i}\delta t\right)\right)\delta t$$

where (δt) is a duration of the time step 26, ($\omega_{z,i}$) is a yaw rate at $i^{th}$ time step, ($v_{x,t}$) is longitudinal velocity at $t^{th}$ time step, and ($v_{y,t}$) is lateral velocity at $t^{th}$ time step. The lateral position (y) may be calculated using the following exemplary equation, which uses similar variables used in the exemplary longitudinal position (x) equation above:

$$y_{CG}(\Delta t)=\sum_{t=0}^{t=\Delta t-\delta t}\left(V_{y,t}\cos\left(\sum_{i=0}^{i=t}\omega_{z,i}\delta t\right)+V_{x,t}\sin\left(\sum_{i=0}^{i=t}\omega_{z,i}\delta t\right)\right)\delta t$$

FIG. 5 illustrates an example of trajectory error 18*b* depicting the vehicle 100 in solid lines at the current vehicle position 28 and in dashed lines at a lagged vehicle position 52. The trajectory control system 10 monitors the current trajectory 16 and identifies the lagged trajectory 50 by assessing the historical trajectory window 32. For example, the trajectory control system 10 determines, via the trajectory control architecture 14, a delta change of the longitudinal position (x) and the lateral position (y) between the current vehicle position 28 and the lagged vehicle position 52. The trajectory control system 10 obtains a lateral distance (β) of the current trajectory 16 at a predefined trajectory point 54 corresponding to the lateral distance, in the current trajectory 16, between the trajectory 16 and a centerline of the vehicle 100 at a known look-ahead longitudinal distance (u). The trajectory control architecture 14 may then calculate the trajectory error 18*b* based on the difference in lateral position (Δy) between the current trajectory 16 and the lagged vehicle position 52 at the same look-ahead point. For example, the following is an exemplary equation that may be used to calculate the trajectory error 18*b* is:

$$\kappa_{Y_{trajectory}}=\delta-(\Delta y+(\alpha)\sin\theta+(\beta)\cos\theta)$$

where $K_{Y_{trajectory}}$ is the trajectory error 18*b* and (δ) is a lateral position of the lagged trajectory look-ahead.

Referring again to FIGS. 2-6, the trajectory 16 of the vehicle 100 is updated at each respective time step 26 based on data received from the advanced driver assistance systems 110. In some examples, the advanced driver assistance systems 110 may include the sensor systems 114 mentioned above, such that the trajectory control architecture 14 may update the trajectory 16 based on data from the advanced driver assistance systems 110. The sensor systems 114 may include a camera and active safety sensors configured as part of the vehicle 100 and disposed along a body 116 of the vehicle 100. For example, the sensor system 114 may capture or otherwise detect if there is a curvature in the road. In response, the trajectory control architecture 14 may update the trajectory 16 to curve in accordance with the curvature of the road. In other examples, the trajectory control architecture 14 may detect that the vehicle 100 is moving through a lane change, such that the trajectory 16 may be updated to reflect the new lane.

Thus, the trajectory control architecture 14 is constantly updating the trajectory 16 in real-time and is configured to compare the projected vehicle position 30 with the current vehicle position 28. For example, the trajectory control architecture 14 is configured to execute the comparison of the projected vehicle position 30 and the current vehicle position 28 based on the trajectory history 24. If there is a discrepancy between the comparisons, such that there is a delta error 18, the trajectory control architecture 14 may execute a tracking error computation to identify a tracking error 18*a*. It is contemplated that different quantities or indicators may be evaluated by the trajectory control architecture 14 to identify the tracking error 18*a* including, but not limited to, a sum of tracking error 18*a* over a sliding window of time (i.e., the trajectory history 24), an integral of the tracking error 18*a*. Below are exemplary equations (a)-(d) that the trajectory control architecture 14 may utilize in determining the tracking error 18*a*, represented as ($\varepsilon_y$):

$$\varepsilon Y_{abs} = \sum_{i=N-Z}^{N} \left| \varepsilon Y_{tracking_i} \right| \tag{a}$$

$$\varepsilon Y_{intgrl} = \int \varepsilon Y_{tracking} \tag{b}$$

$$\varepsilon Y_{RMS} = \sqrt{\frac{1}{N} \sum_{i=N-Z}^{N} \varepsilon Y_{trackng_i}^2} \tag{c}$$

$$\varepsilon Y_{ZCR} = \sum_{i=N-Z}^{N} \left| \frac{\varepsilon Y_{tracking,i}}{\left|\varepsilon Y_{tracking,i}\right|} - \frac{\varepsilon Y_{tracking,i-1}}{\left|\varepsilon Y_{tracking,i-1}\right|} \right| \tag{d}$$

Each of the above exemplary equations (a)-(d) may be utilized to determine if the vehicle 100 is experiencing poor tracking control and whether the tracking control architecture 14 needs to execute adaptions or corrections to the trajectory control system 10 based on a tracking error 18*a*. For example, the tracking error 18*a* may be a result of a sudden lane change and corresponding corrective maneuver resulting in the vehicle 100 being in a different current position 28 than the projected position 30. However, the trajectory control architecture 14 may identify, via one or more of the above equations (a)-(d), that no further action is necessary to return the vehicle 100 to the additional, predicted positions 30 along the trajectory 16. As described further below, the trajectory control architecture 14 may identify various maneuver phases 60 and may determine, for example, that the vehicle 100 was in a counter steer phase 62 of the maneuver phase 60 that resulted in the tracking error 18*a*, but with further monitoring identifies that the vehicle 100 has entered a stability phase 64 with lowered tracking error 18*a*. Thus, no additional adaptation or correction is performed by the trajectory control architecture at that time.

With respect to trajectory error 18*b*, the trajectory control architecture 14 evaluates the historical trajectory window 32, rather than the trajectory history 24 as a whole or on a larger scale. As mentioned above, the trajectory 16 is defined in longitudinal and lateral space and is defined by a series of trajectory points 54 directly in front the vehicle 100. In the trajectory control architecture 14, the trajectory point 54 may have a zero (0) value when the vehicle is traveling on the trajectory 16, and the trajectory point 54 may transition to a non-zero value (i.e., one (1), two (2), three (3), etc.) as the vehicle 100 moves away or deviates from the trajectory 16. For example, the vehicle 100 may approach an adjacent lane, such as during a lane change maneuver away from the trajectory 16. The trajectory control architecture 14 is configured to project the trajectory point 54 based on a determined distance. For example, the trajectory control architecture 14 may project, based on a time step 26, a new trajectory 16 at future time steps 26*a* that correspond with the projected trajectory point 54.

In some instances, the trajectory control architecture 14 may compare the historical trajectory window 32 with the future, projected trajectory point 54 when projecting the new trajectory 16. If the trajectory point 54 changes as the vehicle 100 travels along the trajectory 16, then the trajectory control architecture 14 evaluates the trajectory point 54 relative to the historical trajectory window 32 to determine whether there is a trajectory error 18*b*. Thus, the trajectory control architecture 14 may determine, based on a comparison of the historical trajectory window 32 and the future trajectory point 54, the trajectory error 18*b*. For example, the trajectory control architecture 14 tracks the error 18 of the trajectory 16 and identifies the trajectory error 18*b* based on the projected new trajectory 16 and the historical trajectory window 32. Below are exemplary equations (e)-(h) that the trajectory control architecture 14 may utilize in determining the trajectory error 18, represented as ($K_Y$):

$$\kappa Y_{sum} = \sum_{i=N-Z}^{N} \left| \kappa Y_{trajectoryi} \right| \tag{e}$$

$$\kappa Y_{intgrl} = \int \kappa Y_{trajectory} \tag{f}$$

$$\kappa Y_{RMS} = \sqrt{\frac{1}{N} \sum_{i=N-Z}^{N} \kappa Y_{trajectory_i}^2} \tag{g}$$

$$\kappa Y_{ZCR} = \sum_{i=N-Z}^{N} \left| \frac{\kappa Y_{trajectory,i}}{\left|\kappa Y_{trajectory,i}\right|} - \frac{\kappa Y_{trajectory,i-1}}{\left|\kappa Y_{trajectory,i-1}\right|} \right| \tag{h}$$

The trajectory control architecture 14 is continually monitoring the potential tracking error 18*a* and trajectory error 18*b* to determine whether to execute the mitigation functions 104, described below. The determination as to whether to execute the mitigation functions 104 in response to the error 18 may be executed as part of a classifier comparison 36. For example, if the vehicle 100 is in the process of a sharp lane change, then the likelihood of an error 18 is high. However, as the vehicle 100 progresses through the maneuver phase 60, the trajectory control architecture 14 is configured to anticipate that the stability phase 64 will be achieved and the error 18 would approach zero (0). As a result of the potential errors 18 that may occur at different maneuver phases 60, the maneuver phases 60 are segmented and each assigned an error threshold 70.

Thus, the trajectory control architecture 14 also assesses the maneuver phase 60 when determining and evaluating the error 18. For example, the maneuver phase 60 may include, but is not limited to, an initiation phase 66, the counter steer phase 62, mentioned above, and the stability phase 64. The maneuver phase 60 is utilized as part of the classifier comparison 36, which segments the maneuver phase 60 into each distinct phase 62-66. Once the classifier comparison 36 segments the maneuver phase 60, an error threshold 70 is assigned to each phase 62-66. The error threshold 70 may be stored in the memory hardware 22.

Although described herein as having three (3) distinct phases, the maneuver phase 60 may be segmented into more than 3 phases or less than 3 phases. Each phase 60 has a projected metric, and the trajectory control architecture 14 is configured to identify whether the associated metric has been exceeded and/or whether there is a deviation from the metric. If the metric has been exceeded, the trajectory control architecture 14 determines an error 18 is associated with the maneuver phase 60. The metrics are predefined within the trajectory control architecture 14 and may be used to predict a subsequent phase 62-66 based on the maneuver phase 60.

The trajectory control architecture 14 may execute the classifier comparison 36 once the error 18 has been identified. As described herein, the classifier comparison 36 is used by the trajectory control architecture 14 to determine whether to communicate with the microcontroller 102 to execute the mitigation functions 104. The mitigation functions 104 may be categorized as no intervention 120, mitigation 122, and disengagement 124. The trajectory control architecture 14 utilizes the classifier comparison 36 to determine whether the error 18 should result in the microcontroller 102 executing one of the mitigation functions 104. The controller 12 may communicate the error 18 and the classifier comparison 36 with the microcontroller 102, and the microcontroller 102 may identify which mitigation function 104 to apply. For example, the classifier comparison 36 may reflect that the error 18 was a result of a counter steer phase 62, such that the no intervention 120 mitigation function 104 may be triggered. The no intervention 120 mitigation function 104 indicates that the trajectory 16 is accurate and there is no further action is needed.

The trajectory control architecture 14 may determine, via the classifier comparison 36, at least one of a large tracking error **18*a* and a large trajectory error 18*b* based on the maneuver phase 60. The trajectory control architecture 14 determines the large tracking and trajectory errors 18*a*, 18*b* by comparing the maneuver phase 60 with the error threshold 70 to confirm the high error 18. If the large error 18 is confirmed, the trajectory control architecture 14 communicates with the microcontroller 102 to execute one of the mitigation 122 or disengagement 124 mitigation functions 104**.

For example, if the error 18 based on the classifier comparison 36 indicates intervention, then the microcontroller 102 may execute the mitigation 122 function 104. Mitigation 122 results in the microcontroller 102 executing calculations for the trajectory control architecture 14 to correct and reposition the vehicle 100 along the trajectory 16. If the error 18 is far off the trajectory 16 and the classifier comparison 36 indicates that the vehicle 100 has remained outside of the stability phase 64, then the microcontroller 102 may execute the disengagement 124 mitigation function 104. Disengagement 124 results in the microcontroller 102 alerting the driver that the feature is disengaging and may disengage the active safety feature 112.

Figure 8:
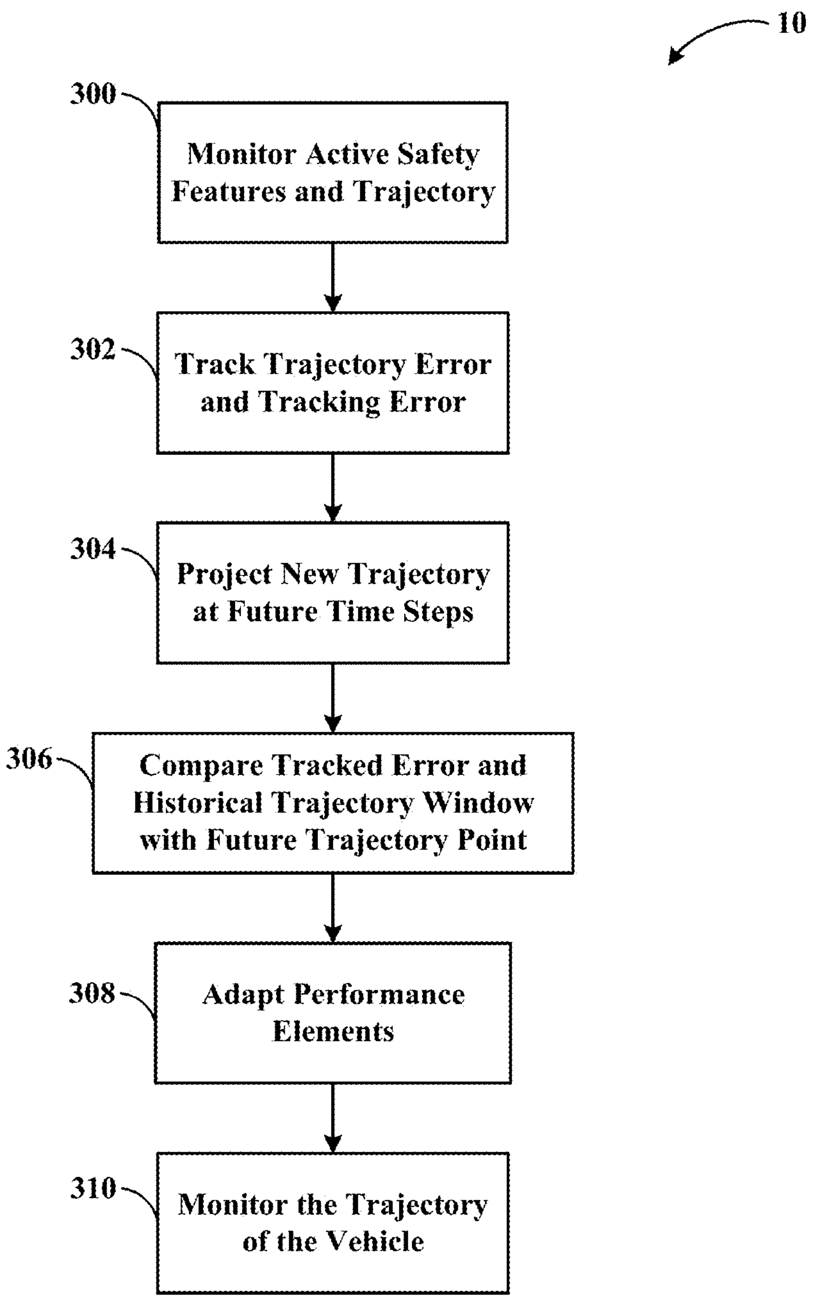
FIG. 8 is an exemplary flow diagram for a trajectory control system according to the present disclosure.

Referring to FIG. 8, an exemplary flow diagram of the trajectory control system 10 is illustrated. At step 300, at least one active safety feature 112 and the trajectory 16 of the vehicle 100 is monitored. The trajectory control architecture 14 tracks, at 302, one of a trajectory error **18*b* and a tracking error 18*a* of the trajectory 16 and projects, at 304, a new trajectory at future time steps 26*a* based on a time step 26 and the trajectory history 24. The trajectory control architecture 14 compares, at 306, the tracking error 18*a* and a historical trajectory window 32 with a future trajectory point 54 and adapts, at 308, performance elements 106 of the vehicle 100 based on the projected new trajectory 16 and the comparison of the tracked error 18 and the trajectory history 24 with the future trajectory point 54. The trajectory control system 10 continues to monitor, at 310, the trajectory 16 of the vehicle 100 based on the adapted performance elements 106**.

Referring again to FIGS. 1-8, the trajectory control system 10 advantageously assists in maneuvering the vehicle 100 when the active safety features 112 are activated as part of the advanced driver assistance systems 110. The functionality of real-time tracking of the trajectory 16 by the trajectory control system 10 allows for real-time adjustment of the active safety features 112. Thus, potential lag or continued deviation is prevented and the active safety features 112 are improved for the purpose of correcting any potential error 18 identified and tracked along the trajectory 16. The trajectory control architecture 14 advantageously improves the ability of the controller 12 to execute real-time monitoring, tracking, and adaptation of the trajectory control system 10.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that when executed by data processing hardware causes the data processing hardware to perform operations comprising:

monitoring, via a trajectory control architecture of a controller, at least one active safety feature and a trajectory of a vehicle;

tracking, via the trajectory control architecture, a vehicle maneuver;

segmenting, via the trajectory control architecture, the vehicle maneuver into distinct maneuver phases including at least an initiation phase, a counter steer phase, and a stability phase;

assigning, via the trajectory control architecture, a unique error threshold to each of the distinct maneuver phases;

tracking, via the trajectory control architecture, an error relative to the trajectory;

comparing the error with a trajectory history stored on the controller and each of the assigned unique error thresholds;

adapting, based on the comparison of the error with the trajectory history and each of the assigned unique error thresholds, performance elements of the vehicle via the trajectory control architecture; and monitoring, based on the adapted performance elements, the trajectory of the vehicle.

2. The method of claim 1, wherein the error includes at least one of a tracking error and a trajectory error.

3. The method of claim 2, further including:

executing, via the trajectory control architecture, a relative vehicle pose computation;

evaluating, via the relative vehicle pose computation, performance metrics of the vehicle relative to the trajectory; and identifying the tracking error based on the relative vehicle pose computation and the evaluated performance metrics.

4. The method of claim 2, further including:

obtaining a lateral distance of the trajectory at a predefined trajectory point corresponding to a known look-ahead longitudinal distance;

calculating the trajectory error based on a difference in lateral position between the trajectory and a lagged vehicle position at the predefined trajectory point; and determining, via the trajectory control architecture, the calculated trajectory error is a first trajectory error based on the distinct maneuver phases.

5. The method of claim 4, further including determining the tracking error includes a first tracking error based on the distinct maneuver phases, wherein determining the first tracking error and the first trajectory error includes comparing the distinct maneuver phases with each of the assigned unique error thresholds.

6. The method of claim 1, further including projecting, based on a time step and the trajectory history, a new trajectory at future time steps.

7. The method of claim 6, wherein tracking the error includes identifying a tracking error based on the trajectory history and a current position.

8. The method of claim 6, wherein projecting the new trajectory includes comparing a historical trajectory window with a future trajectory point.

9. The method of claim 8, further including determining, based on the comparison between the historical trajectory window and the future trajectory point, a trajectory error.

10. A system comprising:

data processing hardware; and memory hardware in communication with the data processing hardware, the memory hardware storing instructions that when executed on the data processing hardware cause the data processing hardware to perform operations comprising:

monitoring, via a trajectory control architecture of a controller, at least one active safety feature and a trajectory of a vehicle;

tracking, via the trajectory control architecture, a vehicle maneuver;

segmenting, via the trajectory control architecture, the vehicle maneuver into distinct maneuver phases including at least an initiation phase, a counter steer phase, and a stability phase;

assigning, via the trajectory control architecture, a unique error threshold to each of the distinct maneuver phases;

tracking, via the trajectory control architecture, an error relative to the trajectory;

comparing the error with a trajectory history stored on the controller and each of the assigned unique error thresholds;

adapting, based on the comparison of the error with the trajectory history and each of the assigned unique error thresholds, performance elements of the vehicle via the trajectory control architecture; and monitoring, based on the adapted performance elements, the trajectory of the vehicle.

11. The system of claim 10, wherein the error includes at least one of a tracking error and a trajectory error.

12. The system of claim 11, further including:

obtaining a lateral distance of the trajectory at a predefined trajectory point corresponding to a known look-ahead longitudinal distance;

calculating the trajectory error based on a difference in lateral position between the trajectory and a lagged vehicle position at the predefined trajectory point; and determining, via the trajectory control architecture, the calculated trajectory error is a first trajectory error based on the distinct maneuver phases.

13. The system of claim 12, further including determining the tracking error includes a first tracking error based on the distinct maneuver phases, wherein determining the first tracking error and the first trajectory error includes comparing the distinct maneuver phases with each of the assigned unique error thresholds.

14. The system of claim 12, further including:

executing, via the trajectory control architecture, a relative vehicle pose computation;

evaluating, via the relative vehicle pose computation, performance metrics of the vehicle relative to the trajectory; and identifying the tracking error based on the relative vehicle pose computation and the evaluated performance metrics.

15. The system of claim 10, further including projecting, based on a time step and the trajectory history, a new trajectory at future time steps.

16. The system of claim 15, wherein tracking the error includes identifying a tracking error based on the projected new trajectory and the trajectory history.

17. The system of claim 15, wherein projecting the new trajectory includes comparing a historical trajectory window with a future trajectory point.

18. The system of claim 17, further including determining, based on the comparison between the historical trajectory window and the future trajectory point, a trajectory error.

19. A computer-implemented method that when executed by data processing hardware causes the data processing hardware to perform operations comprising:

monitoring, via a trajectory control architecture of a controller, at least one active safety feature and a trajectory of a vehicle;

tracking, via the trajectory control architecture, a vehicle maneuver;

segmenting, via the trajectory control architecture, the vehicle maneuver into distinct maneuver phases including at least an initiation phase, a counter steer phase, and a stability phase;

assigning, via the trajectory control architecture, a unique error threshold to each of the distinct maneuver phases;

tracking, via the trajectory control architecture, an error relative to the trajectory, the error including at least one of a trajectory error and a tracking error of the trajectory;

projecting, based on a time step and a trajectory history, a new trajectory at future time steps;

comparing the error and a historical trajectory window with a future trajectory point;

adapting, via the trajectory control architecture, performance elements of the vehicle based on the projected new trajectory and the comparison of the error and the trajectory history with the future trajectory point; and monitoring, based on the adapted performance elements, the trajectory of the vehicle.

20. The method of claim 19, further including:

obtaining a lateral distance of the trajectory at a predefined trajectory point corresponding to a known look-ahead longitudinal distance;

calculating the trajectory error based on a difference in lateral position between the trajectory and a lagged vehicle position at the predefined trajectory point; and determining, via the trajectory control architecture, the calculated trajectory error is a first trajectory error based on the distinct maneuver phases.

* * * * *